(12) United States Patent
Komyo et al.

(10) Patent No.: US 10,711,899 B2
(45) Date of Patent: Jul. 14, 2020

(54) SEAL DEVICE

(71) Applicant: NOK CORPORATION, Tokyo (JP)

(72) Inventors: Akihiro Komyo, Fukushima (JP);
Shinichi Ishibashi, Fukushima (JP);
Takehiro Nakagawa, Fukushima (JP)

(73) Assignee: NOK CORPORATION, Tokyo (JP)

( * ) Notice: Subject to any disclaimer, the term of this patent is extended or adjusted under 35 U.S.C. 154(b) by 111 days.

(21) Appl. No.: 15/779,443

(22) PCT Filed: Nov. 25, 2016

(86) PCT No.: PCT/JP2016/084899
§ 371 (c)(1),
(2) Date: May 25, 2018

(87) PCT Pub. No.: WO2017/094599
PCT Pub. Date: Jun. 8, 2017

(65) Prior Publication Data
US 2018/0259072 A1 Sep. 13, 2018

(30) Foreign Application Priority Data

Nov. 30, 2015 (JP) ................................. 2015-233023
Dec. 3, 2015 (JP) ................................. 2015-236466

(51) Int. Cl.
F16J 15/3244 (2016.01)
F16J 15/3204 (2016.01)
(Continued)

(52) U.S. Cl.
CPC ......... *F16J 15/3204* (2013.01); *F16J 15/164* (2013.01); *F16J 15/3244* (2013.01); *F16J 15/40* (2013.01)

(58) Field of Classification Search
CPC ........ F16J 15/3204; F16J 15/164; F16J 15/40; F16J 15/3232; F16J 15/3244; F16J 15/3256
See application file for complete search history.

(56) References Cited

U.S. PATENT DOCUMENTS 4,906,009 A * 3/1990 Saitoh .................. F16J 15/3232
277/349
6,257,587 B1 * 7/2001 Toth ..................... F16J 15/3256
277/309
(Continued)

FOREIGN PATENT DOCUMENTS

CN 2699066 Y 5/2005
CN 101189461 A 5/2008
(Continued)

OTHER PUBLICATIONS

International Search Report Issue in WIPO Patent Application No. PCT/JP2016/084899, dated Feb. 14, 2017.
(Continued)

*Primary Examiner* — Eugene G Byrd
(74) *Attorney, Agent, or Firm* — Greenblum & Bernstein, P.L.C.

(57) ABSTRACT

A seal device prevents sealing fluid on the inner-machine side from leaking to the outer-machine side between a housing and a rotating shaft inserted into a shaft hole on the housing. The seal lip is attached to the inner periphery of the shaft hole to slidingly contact the seal flange attached to the outer periphery of the rotating shaft. The thread groove, which exerts a fluid pumping action when the shaft is rotating, is provided on the seal flange so as to intersect with a lip end of the seal lip. The thread groove is formed so as to have a relatively small cross-sectional area in a sliding area in the seal flange that the seal lip comes in sliding contact with and have a relatively large cross-sectional area
(Continued)

in an inner peripheral side area located on an inner peripheral side more than the sliding area.

7 Claims, 8 Drawing Sheets

(51) Int. Cl.
 *F16J 15/16* (2006.01)
 *F16J 15/40* (2006.01)

(56) References Cited

U.S. PATENT DOCUMENTS

| | | | | |
|---|---|---|---|---|
| 6,273,428 | B1* | 8/2001 | Sassi | F16J 15/3256 |
| | | | | 277/348 |
| 6,789,805 | B2* | 9/2004 | Sassi | F16J 15/3256 |
| | | | | 277/549 |
| 8,820,749 | B2* | 9/2014 | Tones | F16J 15/4478 |
| | | | | 277/412 |
| 9,644,681 | B2* | 5/2017 | Baart | F16C 33/805 |
| 2004/0173973 | A1 | 9/2004 | Kammerer et al. | |
| 2004/0201179 | A1* | 10/2004 | Iwakata | F16J 15/164 |
| | | | | 277/572 |
| 2004/0228558 | A1* | 11/2004 | Cha | F16C 33/7883 |
| | | | | 384/486 |
| 2007/0063450 | A1* | 3/2007 | Krulis | F16J 15/3244 |
| | | | | 277/551 |
| 2008/0029967 | A1* | 2/2008 | Nakagawa | F16J 15/164 |
| | | | | 277/349 |
| 2009/0127791 | A1* | 5/2009 | Buro | F16J 15/3256 |
| | | | | 277/352 |
| 2011/0006485 | A1 | 1/2011 | Nakagawa | |
| 2013/0321951 | A1 | 12/2013 | Sumiji et al. | |
| 2015/0276059 | A1* | 10/2015 | Nakagawa | F16J 15/164 |
| | | | | 277/351 |
| 2015/0285379 | A1* | 10/2015 | Matsui | F16J 15/3264 |
| | | | | 277/351 |
| 2015/0285380 | A1 | 10/2015 | Nakagawa | |
| 2017/0114901 | A1* | 4/2017 | Yamanaka | F16J 15/32 |
| 2018/0066757 | A1* | 3/2018 | Sakano | F16J 15/3204 |
| 2018/0259072 | A1* | 9/2018 | Komyo | F16J 15/3244 |
| 2018/0347702 | A1* | 12/2018 | Sakano | F16J 15/3232 |

FOREIGN PATENT DOCUMENTS

| | | |
|---|---|---|
| CN | 102016365 A | 4/2011 |
| CN | 103457390 A | 12/2013 |
| CN | 104718404 A | 6/2015 |
| CN | 104769338 A | 7/2015 |
| EP | 2 749 796 A1 | 7/2014 |
| JP | 2-113173 | 4/1990 |
| JP | 3-57563 | 3/1991 |
| JP | 7-208610 | 8/1995 |
| JP | 8-254213 | 10/1996 |
| JP | 2010286023 A | 12/2010 |
| JP | 2014-129837 | 7/2014 |
| WO | 2010/143694 A1 | 12/2010 |

OTHER PUBLICATIONS

Extended European Search Report in Application No. 16 870 536.6, dated Oct. 16, 2018.

* cited by examiner

SEAL DEVICE

BACKGROUND OF THE INVENTION

Field of the Invention

The present invention relates to a seal device that suppresses the leakage of sealing fluid inside a machine, such as an automobile, general machinery, or industrial machinery, out of the machine. The seal device according to the present invention is used, for example, as an oil seal for rotation that seals in inner-machine oil in the automobile-related field.

Description of the Conventional Art

As shown in FIGS. 8(A) and 8(B), there is conventionally known a seal device 101 that seals so as to prevent sealing fluid on the inner-machine side A from leaking to the outer-machine side B between a housing 51 and a rotating shaft 61 that is inserted into a shaft hole 52 provided on the housing 51. The seal device 101 is composed of a combination of a slinger 111 and a lip seal member 121; the slinger 111 is attached to the outer periphery of the rotating shaft 61, and the lip seal member 121 is located on the outer-machine side B of the slinger 111 and is attached to the inner periphery of the shaft hole 52 of the housing 51.

The slinger 111 is made of rigid material such as metal, and integrally has a tubular portion 112 and a seal flange 113; the tubular portion 112 is fitted into an outer peripheral surface of the rotating shaft 61, and the seal flange 113 is provided in one end of the tubular portion 112. A thread groove 114, which exerts a fluid pumping action with a centrifugal force at the time of rotation, is provided on an outer-machine-side end face 113a of the seal flange 113.

On the other hand, the lip seal member 121 has an attachment ring 122 and a rubbery elastic body 123; the attachment ring 122 is fitted into an inner peripheral surface of the shaft hole 52 of the housing 51, and the rubbery elastic body 123 is deposited on the attachment ring 122. The lip seal member 121 is provided with a seal lip (an end face lip) 124 that comes in sliding contact with the outer-machine-side end face 113a of the seal flange 113 in the slinger 111 by the rubbery elastic body 123.

The seal device 101 having the above-described configuration seals in sealing fluid by the seal lip 124 coming in sliding contact with the outer-machine-side end face 113a of the seal flange 113, and also the thread groove 114 provided on the outer-machine-side end face 113a of the seal flange 113 exerts a fluid pumping action with a centrifugal force at the time of rotation and pushes back the sealing fluid to the inner-machine side A; therefore it is possible to exert a beneficial sealing effect.

PRIOR ART DOCUMENT

Patent Documents

Patent Document 1: Japanese Unexamined Utility Model Publication No. 3-57563
Patent Document 2: Japanese Unexamined Patent Publication No. 2-113173
Patent Document 3: Japanese Unexamined Patent Publication No. 2014-129837

SUMMARY OF THE INVENTION

Problem to be Solved by the Invention

However, further improvement of function in the following respects is demanded of the above-described seal device 101.

That is, as described above, the above-described seal device 101 seals in sealing fluid by the seal lip 124 coming in sliding contact with the outer-machine-side end face 113a of the seal flange 113, and also the thread groove 114 provided on the outer-machine-side end face 113a of the seal flange 113 exerts a fluid pumping action with a centrifugal force at the time of rotation and pushes back the sealing fluid to the inner-machine side A; therefore it is possible to exert a beneficial sealing effect; however, in this configuration, the thread groove 114 is disposed so as to intersect with a lip end of the seal lip 124. Therefore, if the rotation of the rotating shaft 61 comes to a stop and the centrifugal force is eliminated, and along with this, it goes into a situation where the fluid pumping action of the thread groove 114 is not exerted, there is fear that the sealing fluid may run down the thread groove 114 and pass by the lip end of the seal lip 124 from its outer peripheral side to the inner peripheral side, and then leak to the outer-machine side B (so-called static leakage occurs).

In view of the above points, the present invention is for a seal device in which a seal lip is configured to come in sliding contact with a seal flange, and a thread groove, which exerts a fluid pumping action at the time of rotation, is provided on the seal flange, and an object of the invention is to provide a seal device capable of suppressing the occurrence of static leakage.

Means for Solving the Problem

To achieve the above-described object, the present invention adopts the following means.

The seal device according to the present invention is one that seals so as to prevent sealing fluid on the inner-machine side from leaking to the outer-machine side between a housing and a rotating shaft inserted into a shaft hole provided on the housing; in the seal device in which a seal lip attached to an inner periphery of the shaft hole of the housing is configured to come in sliding contact with a seal flange attached to an outer periphery of the rotating shaft, and a thread groove, which exerts a fluid pumping action when the rotating shaft is rotating, is provided on the seal flange so as to intersect with a lip end of the seal lip, the thread groove is formed so as to have a relatively small cross-sectional area in a sliding area in the seal flange that the seal lip comes in sliding contact with and have a relatively large cross-sectional area in an inner peripheral side area located on an inner peripheral side more than the sliding area (claim 1).

According to the seal device in the present invention, the cross-sectional area of the thread groove in the sliding area is formed to be smaller than that in the inner peripheral side area; the small cross-sectional area of the thread groove makes sealing fluid not easily flow, and therefore static leakage is less likely to occur. Furthermore, the cross-sectional area of the thread groove in the inner peripheral side is formed to be larger than that in the sliding area; the large cross-sectional area makes sealing fluid easily flow, and therefore it is possible to increase the fluid pumping amount obtained by the fluid pumping action. Consequently, it is possible to provide a seal device in which static leakage is less likely to occur as compared with a case where the cross-sectional area of the thread groove is constant over the entire length of the thread groove and that exerts much the same fluid pumping action. Incidentally, the cross-sectional area of the thread groove here means the cross-sectional area of the thread groove when cut in a direction perpendicular to its longitudinal direction. Furthermore, the cross-sectional shape of the thread groove here means the cross-sectional shape of the thread groove when cut in the direction perpendicular to its longitudinal direction.

Aspects of the cross-sectional shape of the thread groove include an aspect in which the groove depth is constant over the entire length of the thread groove, and the groove width is formed to be relatively small in the sliding area and to be relatively large in the inner peripheral side area (claim 2); and an aspect in which the groove width is constant over the entire length of the thread groove, and the groove depth is formed to be relatively small in the sliding area and to be relatively large in the inner peripheral side area (claim 3). Furthermore, it is also possible that in a combination of the two aspects, the groove width is formed to be relatively small in the sliding area and to be relatively large in the inner peripheral side area, and the groove depth is formed to be relatively small in the sliding area and to be relatively large in the inner peripheral side area. The groove width and the groove depth may be changed in stages, or may be changed gradually.

Effect of the Invention

According to the present invention, it is possible to suppress the occurrence of static leakage in a seal device in which a seal lip is configured to come in sliding contact with a seal flange, and a thread groove, which exerts a fluid pumping action at the time of rotation, is provided on the seal flange.

BRIEF EXPLANATION OF THE DRAWINGS

FIG. 3A is a cross-sectional diagram of the thread groove in a sliding area, and FIG. 3B is a cross-sectional diagram of the thread groove in an inner peripheral side area.

FIG. 4A is a cross-sectional diagram of the thread groove in a sliding area, and FIG. 4B (B) is a cross-sectional diagram of the thread groove in an inner peripheral side area.

FIG. 8A is a cross-sectional diagram of main parts of a seal device according to the conventional example, and FIG. 8B is an explanatory diagram of a thread groove included in the seal device.

DETAILED DESCRIPTION OF PREFERRED EMBODIMENTS

Subsequently, embodiments of the present invention are described with reference to the drawings.

First Embodiment

Figure 1:
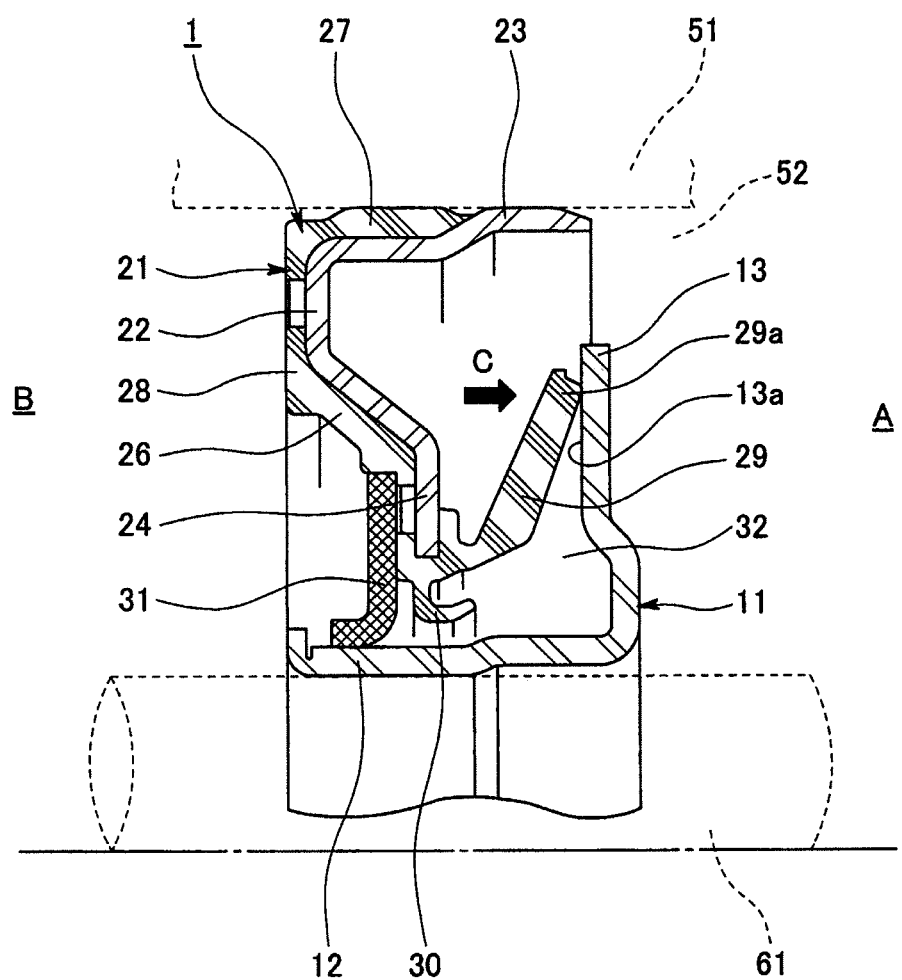
FIG. 1 is a cross-sectional diagram of main parts of a seal device according to a first embodiment of the present invention.
Figure 2:
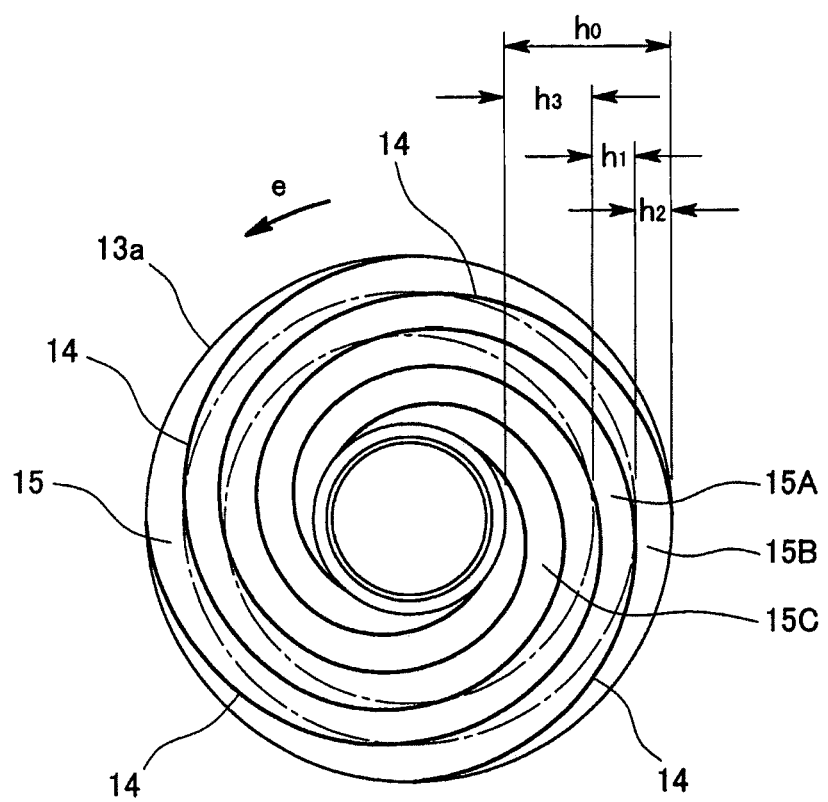
FIG. 2 is an explanatory diagram of a thread groove included in the seal device, viewed from a direction of an arrow C in FIG. 1.

FIGS. 1 to 3 show a seal device 1 according to an embodiment of the present invention.

The seal device 1 according to this embodiment is a seal device (for example, an oil seal for engine) that seals so as to prevent sealing fluid (such as oil) on the inner-machine side A from leaking to the outer-machine side B between a housing (a seal housing) 51 and a rotating shaft 61 that is inserted into a shaft hole 52 provided on the housing 51, and is composed of a combination of a slinger 11 and a lip seal member 21; the slinger 11 is attached to the outer periphery of the rotating shaft 61, and the lip seal member 21 is located on the outer-machine side B of the slinger 11 and is attached to the inner periphery of the shaft hole 52 of the housing 51.

The slinger 11 is made of rigid material such as metal, and integrally has a tubular portion (a sleeve portion) 12 and a seal flange (a flange portion) 13; the tubular portion 12 is fixed (fitted) to an outer peripheral surface of the rotating shaft 61, and the seal flange 13 radially faces outward and is provided in one end (an inner-machine-side end) of the tubular portion 12. As shown in FIG. 2, a helical thread groove 14, which exerts a pumping action with a centrifugal force when the rotating shaft 61 is rotating, thereby exerting an action of pushing back sealing fluid to the outer peripheral side (the inner-machine side A), is provided on an outer-machine-side end face 13a of the seal flange 13. An arrow e indicates the rotating direction of the rotating shaft 61. Details of the outer-machine-side end face 13a of the seal flange 13 and the thread groove 14 will be described later.

On the other hand, the lip seal member 21 has an attachment ring 22 made of rigid material such as metal and a rubbery elastic body 26; the attachment ring 22 is fixed (fitted) to an inner peripheral surface of the shaft hole 52 of the housing 51, and the rubbery elastic body 26 is deposited on the attachment ring 22 (by cure adhesion). An outer peripheral seal portion 27, an end face deposited portion 28, a seal lip (an end face lip) 29, and a grease retention lip 30 are integrally provided. The outer peripheral seal portion 27 is brought into contact with the inner peripheral surface of the shaft hole 52 of the housing 51 by the rubbery elastic body 26, thereby sealing between the housing 51 and the attachment ring 22. The end face deposited portion 28 is deposited on an end face portion of the attachment ring 22. The seal lip 29 comes in sliding contact with the outer-machine-side end face 13a of the seal flange 13 in the slinger 11. The grease retention lip 30 is in non-contact with the slinger 11. A lip end 29a of the seal lip 29 comes in sliding contact with the outer-machine-side end face 13a of the seal flange 13, and the lip end 29a of the seal lip 29 and the thread groove 14 are disposed so as to intersect with each other. Furthermore, a dust lip 31 is attached to a position on the inner peripheral side of the end face deposited portion 28. The dust lip 31 is made of fabric; alternatively, the dust lip 31 may be integral with the rubbery elastic body 26.

The attachment ring 22 integrally has an outer peripheral tubular portion 23 and a flange portion 24; the outer peripheral tubular portion 23 is fixed (fitted) to the inner peripheral surface of the shaft hole 52 of the housing 51, and the flange portion 24 radially faces inward and is provided in one end (an outer-machine-side end) of the outer peripheral tubular portion 23.

Furthermore, in this embodiment, particularly, the outer-machine-side end face 13a of the seal flange 13 and the thread groove 14 are configured as below.

That is, as shown in FIG. 2, the seal flange 13 has a thread groove forming area 15 with the thread groove 14 formed on the outer-machine-side end face 13a. The thread groove forming area 15 is an annular area having a predetermined radial width $h_0$. Furthermore, the thread groove forming area 15 is divided into a sliding area 15A that the seal lip 29 comes in sliding contact with, an outer peripheral side area 15B on the outer peripheral side of the sliding area 15A, and an inner peripheral side area 15C on the inner peripheral side of the sliding area 15A. The sliding area 15A is an annular area having a predetermined radial width $h_1$. The outer peripheral side area 15B is an annular area having a predetermined radial width $h_2$. The inner peripheral side area 15C is also an annular area having a predetermined radial width $h_3$.

In FIG. 2, four thread grooves 14 are equally spaced on a circle; since they all have the same configuration, only one of them is described.

The thread groove 14 is formed into a groove extending from an outer peripheral end of the outer peripheral side area 15B to an inner peripheral end of the inner peripheral side area 15C through the sliding area 15A.

Figure 3A:
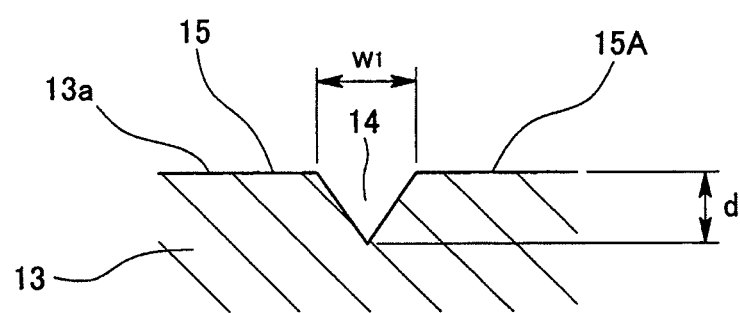
FIGS. 3A and 3B are cross-sectional diagrams of the thread groove.
Figure 3B:
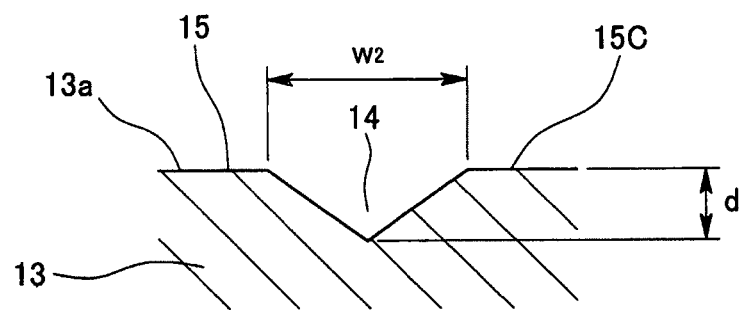

Furthermore, the thread groove 14 is formed to have a relatively small cross-sectional area in the sliding area 15A and a relatively large cross-sectional area in the inner peripheral side area 15C; for more detail, as shown in FIG. 3, the groove depth d of the thread groove 14 is constant over the entire length of the thread groove, and its groove width is formed to be relatively small in the sliding area 15A as shown in FIG. 3(A) and to be relatively large in the inner peripheral side area 15C as shown in FIG. 3(B) ($w_1 < w_2$, where $w_1$ denotes the groove width in the sliding area 15A, and $w_2$ denotes the groove width in the inner peripheral side area 15C).

Then, this thread groove 14 is formed, for example, by setting its cross-sectional area to gradually expand from the outer peripheral end of the outer peripheral side area 15B to the inner peripheral end of the inner peripheral side area 15C, and is also formed by setting its groove width, too, to gradually expand from the outer peripheral end of the outer peripheral side area 15B to the inner peripheral end of the inner peripheral side area 15C.

In the seal device 1 having the above-described configuration, when the rotating shaft 61 is rotating, the lip end 29a of the seal lip 29 comes in sliding contact with the outer-machine-side end face 13a of the seal flange 13 in the slinger 11, thereby the seal lip 29 exerts the sealing function, and also, the slinger 11, which rotates along with the rotating shaft 61, exerts a fluid shaking-off action of the seal flange 13 and a fluid pumping action of the thread groove 14; therefore, even if there is fluid passing between the seal lip 29 and the seal flange 13, the fluid can be pushed back to the outer peripheral side (the inner-machine side A), and thus, the beneficial sealing function is exerted.

Furthermore, when the rotation of the rotating shaft 61 comes to a stop, the centrifugal force is eliminated, and along with this, the above-described fluid shaking-off action and fluid pumping action come to a temporary stop; therefore, although there is fear that some sealing fluid may run down the thread groove 14 and flow out from the inner-machine side A into an inner peripheral side space 32 of the seal lip 29, in the above-described seal device 1, the cross-sectional area of the thread groove 14 in the sliding area 15A is formed to be smaller than that in the inner peripheral side area 15C, and sealing fluid does not easily flow through the thread groove 14 having this small cross-sectional area, and thus the sealing fluid is less likely to run down the thread groove 14 and flow out from the inner-machine side A into the inner peripheral side space 32 of the seal lip 29. Accordingly, it is possible to suppress the occurrence of static leakage, and is possible to at least reduce the amount of static leakage.

Moreover, in the seal device 1 having the above-described configuration, the cross-sectional area of the thread groove 14 in the inner peripheral side area 15C is formed to be larger than that in the sliding area 15A, and sealing fluid easily flows through the thread groove 14 having this large cross-sectional area; therefore, it is possible to increase the fluid pumping amount obtained by the fluid pumping action.

Consequently, it is possible to provide a seal device in which static leakage is less likely to occur as compared with a case where the cross-sectional area of the thread groove 14 is constant over the entire length of the thread groove and that exerts much the same fluid pumping action.

Second Embodiment

In the above-described first embodiment, the cross-sectional shape of the thread groove 14 is a form that the groove depth d is constant over the entire length of the thread groove, and the groove width is formed to be relatively small in the sliding area 15A and to be relatively large in the inner peripheral side area 15C ($w_1 < w_2$); furthermore, it can also be a form that the groove width is constant over the entire length of the thread groove, and the groove depth is formed to be relatively small in the sliding area 15A and to be relatively large in the inner peripheral side area 15C.

Figure 4A:
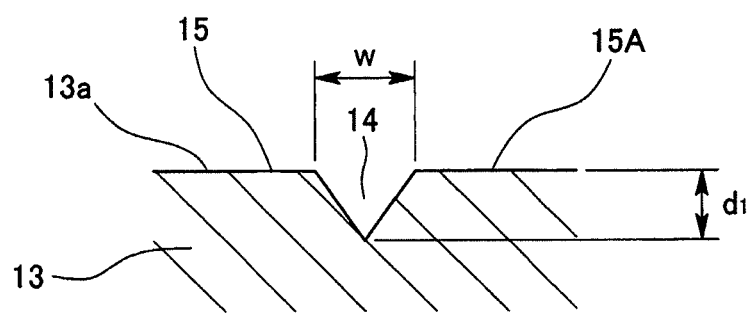
FIGS. 4A and 4B are cross-sectional diagram diagrams of a thread groove included in a seal device according to a second embodiment of the present invention.
Figure 4B:
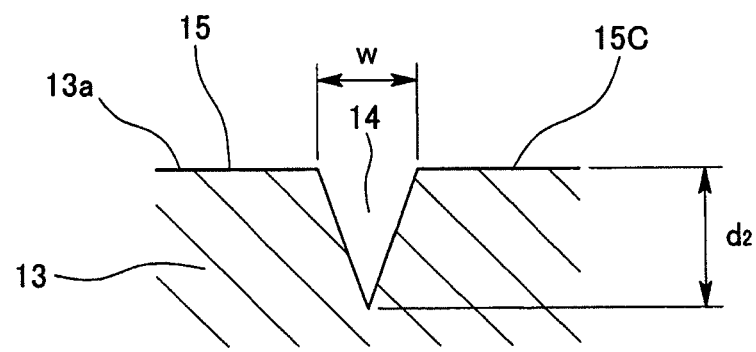

FIG. 4 shows an example of this form, where the groove width w is constant over the entire length of the thread groove, and the groove depth is formed to be relatively small in the sliding area 15A as shown in FIG. 4(A) and to be relatively large in the inner peripheral side area 15C as shown in FIG. 4(B) ($d_1 < d_2$, where $d_1$ denotes the groove depth in the sliding area 15A, and $d_2$ denotes the groove depth in the inner peripheral side area 15C).

Then, this thread groove 14 is formed, for example, by setting its groove depth to gradually expand from the outer peripheral end of the outer peripheral side area 15B to the inner peripheral end of the inner peripheral side area 15C.

Incidentally, in the above-described first and second embodiments, the cross-sectional shape of the thread groove 14 is triangular in cross-section; however, the cross-sectional shape of the thread groove 14 is not particularly limited, and can also be, for example, trapezoidal, rectangular, or circular in cross-section.

Figure 5:
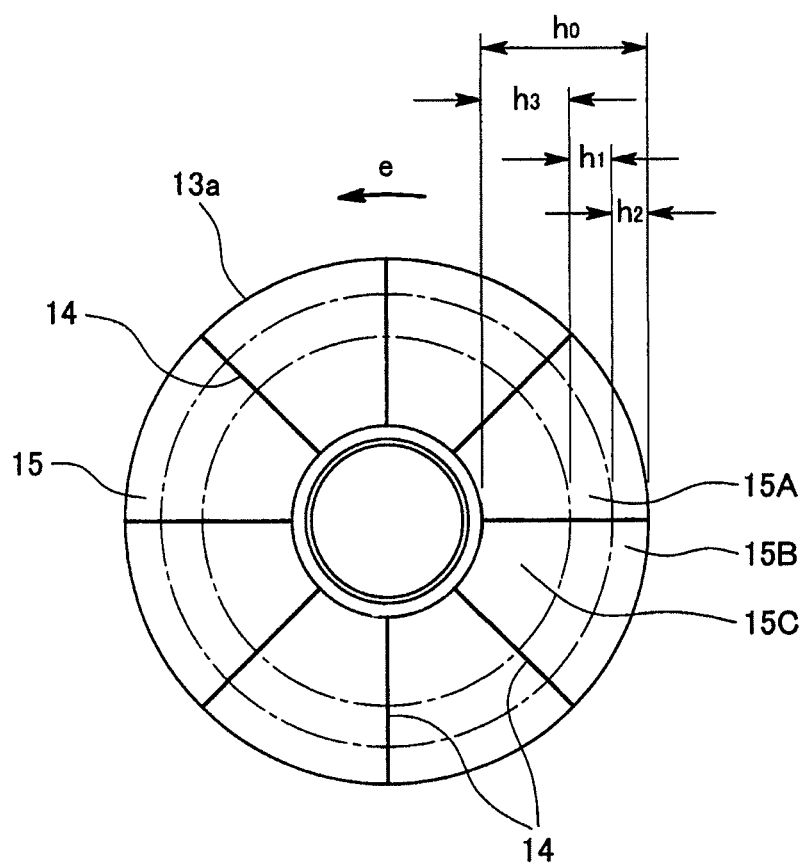
FIG. 5 is an explanatory diagram showing another example of the shape of the thread groove.

Furthermore, in the above-described first and second embodiments, the planar shape (the shape viewed from a direction of an arrow C) of the thread groove 14 is a curved shape; alternatively, the planar shape of the thread groove 14 can be a linear shape. Moreover, thread groove 14 is not limited to be a helical fashion, and can be a radial fashion as shown in FIG. 5 in which a plurality of (in the drawing, eight) grooves extending in a radial direction are provided.

Subsequently, the invention according to a reference example is described.

Problem to be Solved by the Invention

The invention according to the reference example is for a seal device in which a seal lip is configured to come in sliding contact with a seal flange, and an object of the invention is to provide a seal device having a structure in which the fluid pumping action is exerted and static leakage is less likely to occur.

Means for Solving the Problem

To achieve the above-described object, the invention according to the reference example adopts the following means.

That is, the invention according to the reference example is a seal device that seals so as to prevent sealing fluid on the inner-machine side from leaking to the outer-machine side between a housing and a rotating shaft that is inserted into a shaft hole provided on the housing; in the seal device in which a seal lip attached to the inner periphery of the shaft hole of the housing is configured to come in sliding contact with a seal flange attached to the outer periphery of the rotating shaft, a pumping fluid passage having a screw thread pattern in which minute bumps and dents are continuously arranged is provided on an outer-machine-side end face of the seal flange so as to intersect with a lip end of the seal lip.

In the invention according to this reference example, instead of conventional thread grooves, the pumping fluid passage having the screw thread pattern in which minute bumps and dents are continuously arranged is provided on the outer-machine-side end face of the seal flange so as to intersect with a lip end of the seal lip, and this pumping fluid passage exerts a fluid pumping action with a centrifugal force at the time of rotation and pushes back sealing fluid to the inner-machine side.

Furthermore, the pumping fluid passage composed of a continuous body of minute bumps and dents has a higher flow resistance when sealing fluid flows than that of the thread groove having the constant depth in a length direction. Therefore, sealing fluid does not easily flow, and static leakage is less likely to occur.

The bumps and dents are, for example, electric spark machining marks, press working marks, shot blast working marks, or laser machining marks.

Effect of the Invention

According to the invention relating to the reference example for a seal device in which a seal lip is configured to come in sliding contact with a seal flange, it is possible to provide a seal device having a structure in which a fluid pumping action is exerted and static leakage is less likely to occur.

DETAILED DESCRIPTION OF PREFERRED EMBODIMENT

Subsequently, an embodiment of the invention according to the reference example is described with reference to the drawings.

Figure 6:
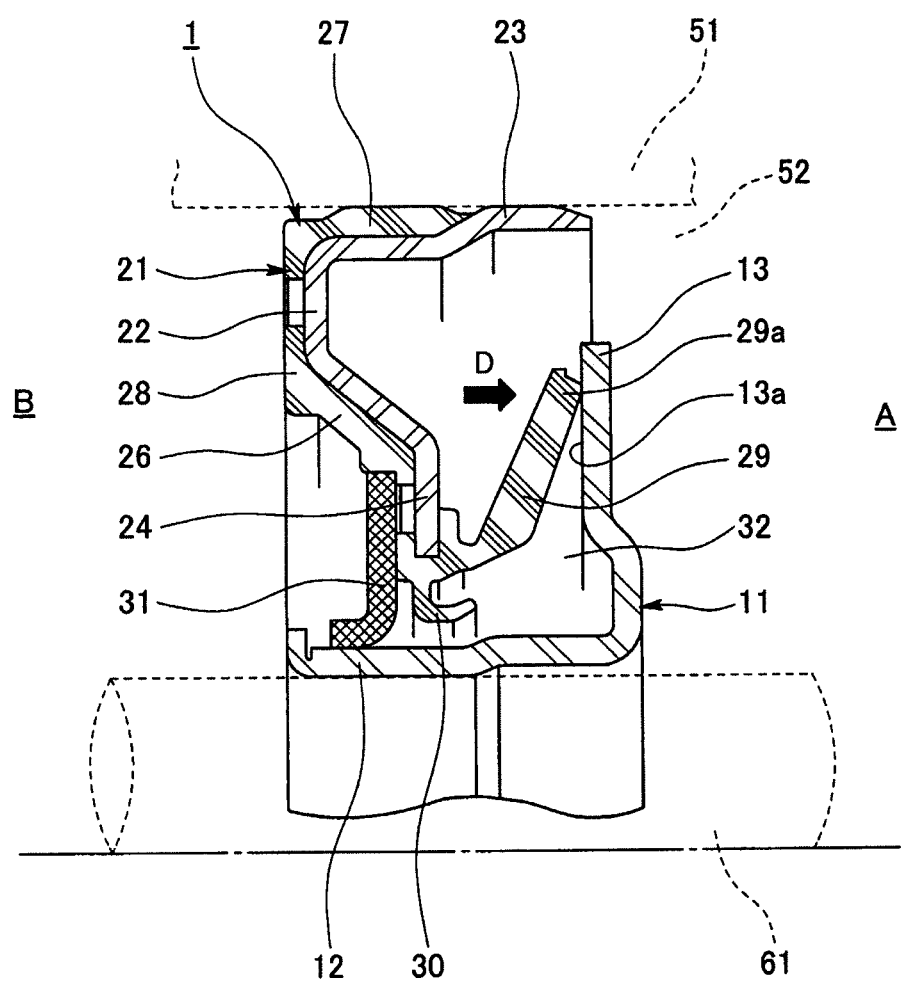
FIG. 6 is a cross-sectional diagram of main parts of a seal device according to a reference example of the present invention.
Figure 7:
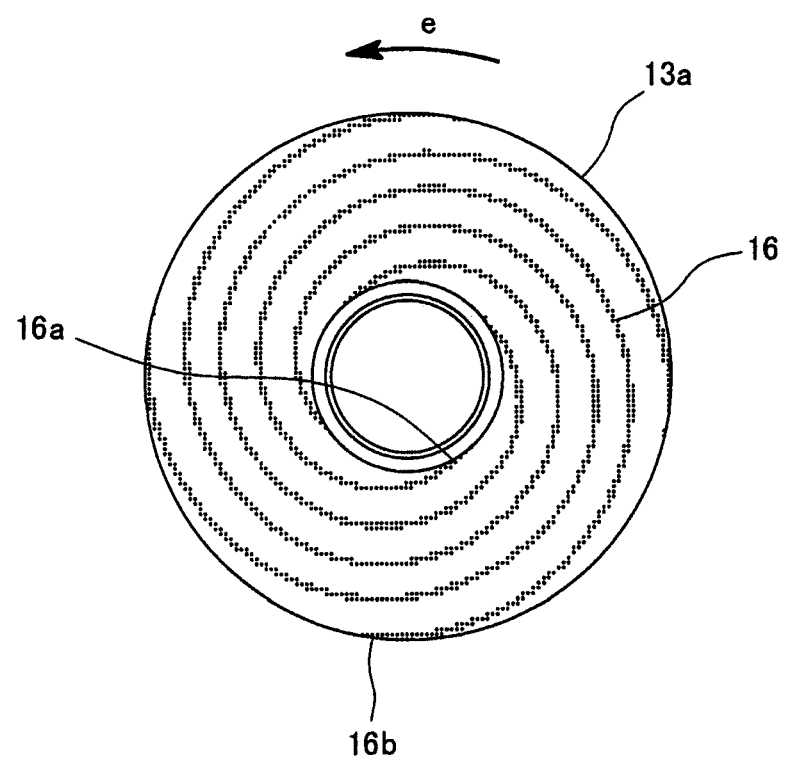
FIG. 7 is an explanatory diagram of a pumping fluid passage included in the seal device, viewed from a direction of an arrow D in FIG. 6.
Figure 8A:
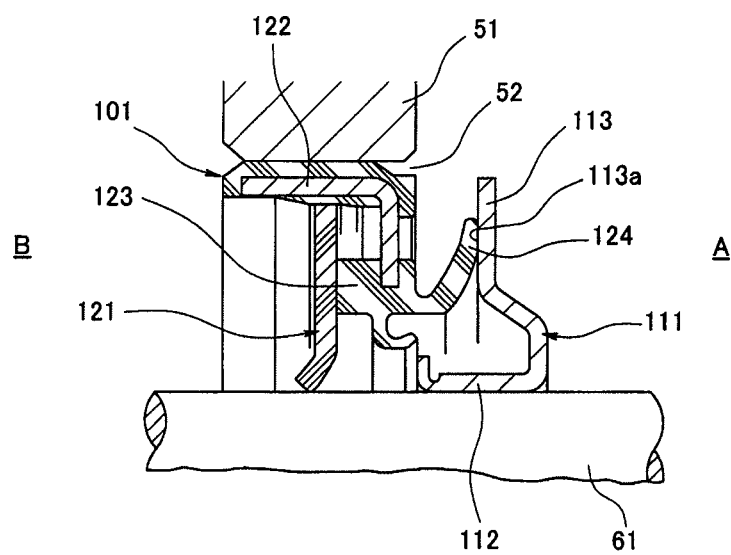
FIGS. 8A and 8B are diagrams showing a conventional example.
Figure 8B:
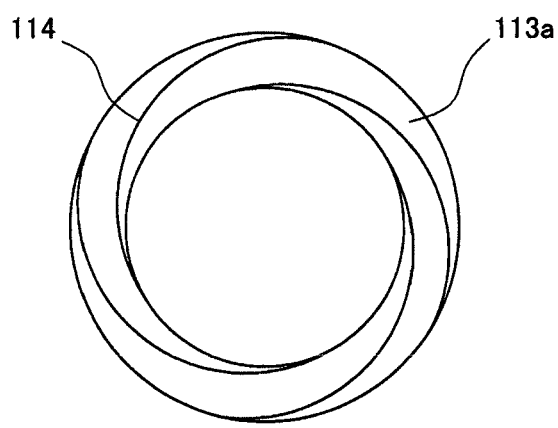

FIGS. 6 and 7 show a seal device 1 according to the embodiment of the invention according to the reference example.

The seal device 1 according to the embodiment of the invention according to the reference example is a seal device (for example, an oil seal for engine) that seals so as to prevent sealing fluid (such as oil) on the inner-machine side A from leaking to the outer-machine side B between the housing (a seal housing) 51 and the rotating shaft 61 that is inserted into the shaft hole 52 provided on the housing 51, and is composed of a combination of the slinger 11 and the lip seal member 21; the slinger 11 is attached to the outer periphery of the rotating shaft 61, and the lip seal member 21 is located on the outer-machine side B of the slinger 11 and is attached to the inner periphery of the shaft hole 52 of the housing 51.

The slinger 11 is made of rigid material such as metal, and integrally has the tubular portion (a sleeve portion) 12 and the seal flange (a flange portion) 13; the tubular portion 12 is fixed (fitted) to the outer peripheral surface of the rotating shaft 61, and the seal flange 13 radially faces outward and is provided in one end (an inner-machine-side end) of the tubular portion 12.

On the other hand, the lip seal member 21 has the attachment ring 22 made of rigid material such as metal and the rubbery elastic body 26; the attachment ring 22 is fixed (fitted) to the inner peripheral surface of the shaft hole 52 of the housing 51, and the rubbery elastic body 26 is deposited on the attachment ring 22 (by cure adhesion). The outer peripheral seal portion 27, the end face deposited portion 28, the seal lip (an end face lip) 29, and the grease retention lip 30 are integrally provided. The outer peripheral seal portion 27 is brought into contact with the inner peripheral surface of the shaft hole 52 of the housing 51 by the rubbery elastic body 26, thereby sealing between the housing 51 and the attachment ring 22. The end face deposited portion 28 is deposited on the end face portion of the attachment ring 22. The seal lip 29 comes in sliding contact with the outer-machine-side end face 13a of the seal flange 13 in the slinger 11. The grease retention lip 30 is in non-contact with the slinger 11. The lip end 29a of the seal lip 29 comes in sliding contact with the outer-machine-side end face 13a of the seal flange 13. Furthermore, the dust lip 31 is attached to a position on the inner peripheral side of the end face deposited portion 28. The dust lip 31 is made of fabric; alternatively, the dust lip 31 may be integral with the rubbery elastic body 26.

The attachment ring 22 integrally has the outer peripheral tubular portion 23 and the flange portion 24; the outer peripheral tubular portion 23 is fixed (fitted) to the inner peripheral surface of the shaft hole 52 of the housing 51, and the flange portion 24 radially faces inward and is provided in one end (an outer-machine-side end) of the outer peripheral tubular portion 23.

Furthermore, in this embodiment of the invention according to the reference example, particularly, a pumping fluid passage 16 having a screw thread pattern in which minute bumps and dents are continuously arranged as shown in FIG. 7 is provided on the outer-machine-side end face 13a of the seal flange 13. This pumping fluid passage 16 exerts a fluid pumping action with a centrifugal force when the rotating shaft 61 is rotating, thereby exerting an action of pushing back sealing fluid to the outer peripheral side (the inner-machine side A), and is configured as follows.

That is, the pumping fluid passage 16 has a screw thread pattern in which a large number of minute bumps and dents are continuously arranged into a strip having a predetermined length and width, and is formed in a helical fashion. In FIG. 7, four pumping fluid passages 16 are equally spaced on a circle; however, the number of pumping fluid passages 16 is not particularly limited. The directions of the screw and the helix are a direction in which an outer peripheral end 16b of the fluid passage 16 is displaced more backward with respect to a rotating direction e of the rotating shaft 61 than an inner peripheral end 16a. The pumping fluid passage 16 is disposed so as to intersect with the lip end 29a of the seal lip 29.

The minute bumps and dents are formed by an electric spark machining method, a press working method, a shot blast working method, or a laser machining method, and formed as electric spark machining marks, press working marks, shot blast working marks, or laser machining marks. Out of these methods, the electric spark machining method and the laser machining method allow to easily perform a topical process, and therefore are suited particularly for the processing of a pattern of bumps and dents. Furthermore, there are advantages that the impact caused by the processing is small, and the change in dimension of the slinger 11 is less likely to occur.

The outer-machine-side end face 13a of the seal flange 13 is formed to be a smooth surface, and the pumping fluid passage 16 composed of a continuous body (strip) of minute bumps and dents is formed on the smooth-surfaced outer-machine-side end face 13a.

In the seal device 1 having the above-described configuration, when the rotating shaft 61 is rotating, the lip end 29a of the seal lip 29 comes in sliding contact with the outer-machine-side end face 13a of the seal flange 13 in the slinger 11, thereby the seal lip 29 exerts the sealing function, and also, the slinger 11, which rotates along with the rotating shaft 61, exerts a fluid shaking-off action of the seal flange 13, and further the pumping fluid passage 16 provided on the outer-machine-side end face 13a of the seal flange 13 exerts a fluid pumping action as described above. Therefore, the beneficial sealing effect is exerted.

Furthermore, when the rotation of the rotating shaft 61 comes to a stop, the centrifugal force is eliminated, and along with this, the above-described fluid shaking-off action and fluid pumping action come to a temporary stop; therefore, although there is fear that some sealing fluid may run down the pumping fluid passage 16 and flow out from the inner-machine side A into the inner peripheral side space 32 of the seal lip 29, the pumping fluid passage 16 has a higher flow resistance when sealing fluid flows than that of the thread groove having the constant depth in a length direction according to the conventional technology. Therefore, as sealing fluid does not easily flow to the pumping fluid passage 16, it is possible to suppress the occurrence of static leakage, or is possible to at least reduce the amount of static leakage. The bottom surface of the pumping fluid passage 16 is not a flat surface but an uneven surface; therefore, sealing fluid such as oil having a predetermined viscosity does not easily flow through the pumping fluid passage 16.

DESCRIPTION OF REFERENCE NUMERALS 1 seal device
11 slinger
12 tubular portion
13 seal flange
13a outer-machine-side end face
14 thread groove
15 thread groove forming area
15A sliding area
15B outer peripheral side area
15C inner peripheral side area
16 pumping fluid passage
16a inner peripheral end
16b outer peripheral end
21 lip seal member
22 attachment ring
23 outer peripheral tubular portion
24 flange portion
26 rubbery elastic body
27 outer peripheral seal portion
28 end face deposited portion
29 seal lip
29a lip end
30 grease retention lip
31 dust lip
32 inner peripheral side space
51 housing
52 shaft hole
61 rotating shaft
A inner-machine side
B outer-machine side

What is claimed is:

1. A seal device that seals so as to prevent sealing fluid on an inner-machine side from leaking to an outer-machine side between a housing and a rotating shaft inserted into a shaft hole provided on the housing, in which a seal lip attached to an inner periphery of the shaft hole of the housing is configured to come in sliding contact with a seal flange attached to an outer periphery of the rotating shaft, and a thread groove, which exerts a fluid pumping action when the rotating shaft is rotating, is provided on the seal flange so as to intersect with a lip end of the seal lip,
wherein cross-sectional area of the thread groove in a sliding area in the seal flange that the seal lip comes in sliding contact with is formed to be smaller than that in an inner peripheral side area located on an inner peripheral side and cross-sectional area of the thread groove in the inner peripheral side is formed to be larger than that in the sliding area.

2. The seal device according to claim 1, wherein
the thread groove is formed to have a constant groove depth over an entire length of the thread groove and to have a groove width that is formed to be smaller in the sliding area and larger in the inner peripheral side area.

3. The seal device according to claim 1, wherein
the thread groove is formed to have a constant groove width over an entire length of the thread groove and to have a groove depth that is formed to be smaller in the sliding area and larger in the inner peripheral side area.

4. The seal device according to claim 1, wherein the cross-sectional area of the thread groove gradually expands from an outer peripheral end of an outer peripheral side area to the inner peripheral end of the inner peripheral side area.

5. The seal device according to claim 1, further comprising a grease retention lip integrally formed with the seal lip.

6. The seal device according to claim 2, wherein the groove width gradually expands from an outer peripheral end of an outer peripheral side area to the inner peripheral end of the inner peripheral side area.

7. The seal device according to claim 3, wherein the groove depth gradually expands from an outer peripheral end of an outer peripheral side area to the inner peripheral end of the inner peripheral side area.

* * * * *